US012682546B2

(12) United States Patent
Kawamata

(10) Patent No.: US 12,682,546 B2
(45) Date of Patent: Jul. 14, 2026

(54) RENDERING SYSTEM AND AUTOMATED DRIVING VERIFICATION SYSTEM

(71) Applicant: SONY SEMICONDUCTOR SOLUTIONS CORPORATION, Kanagawa (JP)

(72) Inventor: Daisuke Kawamata, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 962 days.

(21) Appl. No.: 17/906,327

(22) PCT Filed: Feb. 15, 2021

(86) PCT No.: PCT/JP2021/005402
§ 371 (c)(1),
(2) Date: Sep. 14, 2022

(87) PCT Pub. No.: WO2021/192714
PCT Pub. Date: Sep. 30, 2021

(65) Prior Publication Data
US 2023/0101876 A1 Mar. 30, 2023

(30) Foreign Application Priority Data
Mar. 24, 2020 (JP) ................................ 2020-052429

(51) Int. Cl.
*G06T 15/06* (2011.01)
*G06T 15/20* (2011.01)
(Continued)

(52) U.S. Cl.
CPC .............. *G06T 15/06* (2013.01); *G06T 15/20* (2013.01); *G06T 15/50* (2013.01); *G01S 17/89* (2013.01); *G01S 17/894* (2020.01)

(58) Field of Classification Search
CPC ......... G06T 15/06; G06T 15/20; G06T 15/50; G01S 17/89; G01S 17/894
See application file for complete search history.

(56) References Cited

U.S. PATENT DOCUMENTS

2008/0144964 A1* 6/2008 Soinio ....................... G06T 5/80
382/275
2020/0160598 A1 5/2020 Manivasagam et al.
(Continued)

FOREIGN PATENT DOCUMENTS

JP 2012-253778 A 12/2012
JP 2018-060511 A 4/2018
JP 2020-039126 A 3/2020

OTHER PUBLICATIONS

Gu et. al., "Coded Rolling Shutter Photography: Flexible Space-Time Sampline", 2010 IEEE International Conference on Computational Photography (ICCP), Cambridge, MA, USA, 2010, pp. 1-8, doi: 10.1109/ICCPHOT.2010.5585094 (Year: 2010).*
(Continued)

*Primary Examiner* — Maurice L. McDowell, Jr.
(74) *Attorney, Agent, or Firm* — CHIP LAW GROUP

(57) ABSTRACT

The rendering system of the present disclosure includes an image sensor model having a rolling shutter function of performing exposure in units of line blocks using one or a plurality of pixel rows as one line block; and a rendering engine for processing and drawing image data. The image sensor model controls the rendering engine so that only a region of a line block being exposed is drawn.

19 Claims, 15 Drawing Sheets

(51) Int. Cl.
 *G06T 15/50*      (2011.01)
 *G01S 17/89*      (2020.01)
 *G01S 17/894*      (2020.01)

(56)            References Cited

U.S. PATENT DOCUMENTS

2021/0329169 A1*   10/2021   Hariyani ................. B60R 11/04
2022/0171071 A1*   6/2022   Liu ........................ G01S 17/931

OTHER PUBLICATIONS

Schubert et al., "Rolling-shutter modelling for direct visual-inertial
odometry." 2019 IEEE/RSJ International Conference on Intelligent
Robots and Systems (IROS). IEEE, 2019 (Year: 2019).*
International Search Report and Written Opinion of PCT Applica-
tion No. PCT/JP2021/005402, issued on Apr. 20, 2021, 11 pages of
ISRWO.
Manivasagam, et al., "LIDARsim: Realistic LiDAR Simulation by
Leveraging the Real World", Computer Vision and Pattern Recog-
nition, Jun. 16, 2020, 11 pages.

\* cited by examiner

LIGHT
SOURCE
(t, Δt)

LENS MODEL CORRECTS
VIEWPOINT POSITION
FROM OCL SHIFT AMOUNT

MAIN RAY

30 {

SENSOR MODEL CORRECTS
VIEWPOINT POSITION FROM
OCL SHIFT AMOUNT AT (x,y)
POSITION

} 12

10 {

SP₁    SP₂  SP₁    SP₂  SP₁    SP₂
  11         11         11

(x,y,t,Δt)

RENDERING SYSTEM AND AUTOMATED DRIVING VERIFICATION SYSTEM

CROSS REFERENCE TO RELATED APPLICATIONS

This application is a U.S. National Phase of International Patent Application No. PCT/JP2021/005402 filed on Feb. 15, 2021, which claims priority benefit of Japanese Patent Application No. JP 2020-052429 filed in the Japan Patent Office on Mar. 24, 2020. Each of the above-referenced applications is hereby incorporated herein by reference in its entirety.

TECHNICAL FIELD

The present disclosure relates to a rendering system and an automated driving verification system.

BACKGROUND ART

In developing an automated driving system, an automated driving algorithm is verified by simulation in virtual space. In order to verify the automated driving algorithm, a model of an image sensor that plays the role of the human eye is required, and an input image that is very similar to a live-action image is generated by CG (computer graphic) synthesis technology (for example, see PTL 1).

CITATION LIST

Patent Literature

[PTL 1]
JP 2018-60511 A

SUMMARY

Technical Problem

Here, in an automated driving system, assuming a case where a sensor having a rolling shutter function of performing exposure in units of line blocks using one or a plurality of pixel rows as line blocks and acquiring a pixel value for each line block is used as an image sensor mounted on a vehicle, for example, it is necessary to realize a rolling shutter in precise modeling. However, if full-screen drawing is performed with the time resolution increased in order to reproduce the exposure in units of line blocks, the execution speed is significantly reduced and drawing takes time.

Therefore, an object of the present disclosure is to provide a rendering system that makes it possible to shorten the drawing time in realizing a rolling shutter in modeling an image sensor, and an automated driving verification system that uses the rendering system.

Solution to Problem

A rendering system of the present disclosure for achieving the above object includes: an image sensor model having a rolling shutter function of performing exposure in units of line blocks using one or a plurality of pixel rows as one line block; and a rendering engine for processing and drawing image data.

The image sensor model controls the rendering engine so that only a region of a line block being exposed is drawn.

An automated driving verification system of the present disclosure for achieving the above object includes: an image sensor model having a rolling shutter function of performing exposure in units of line blocks using one or a plurality of pixel rows as one line block; a rendering engine for processing and drawing image data; and an application processor on which a verification target automated driving software is mounted, wherein the image sensor model controls the rendering engine so that only a region of a line block being exposed is drawn.

BRIEF DESCRIPTION OF DRAWINGS

FIG. 8A is a configuration diagram of pixels in an image sensor model that employs a wide dynamic range realized with the sub-pixel structure method, and FIG. 8B is an explanatory diagram of viewpoint tracing.

DESCRIPTION OF EMBODIMENTS

Figure 1:
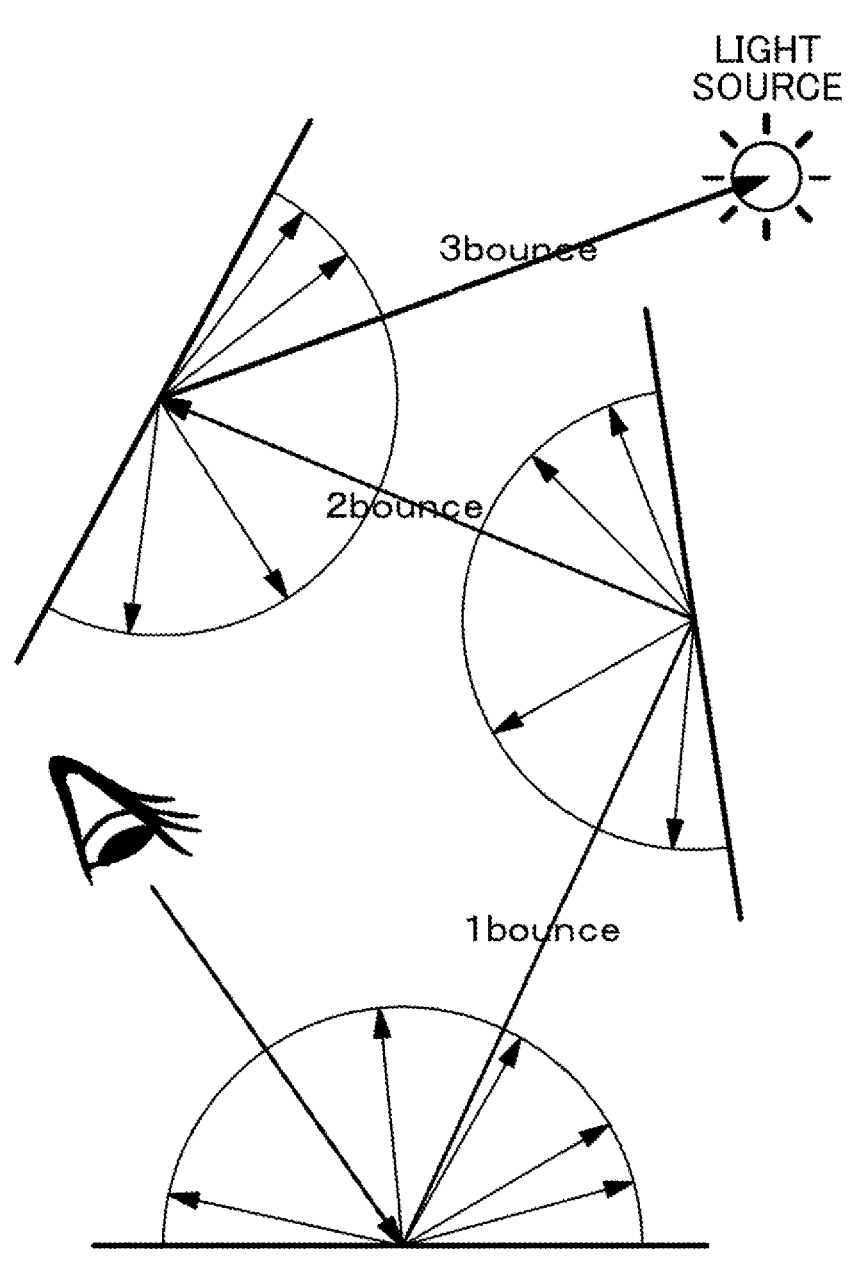
FIG. 1 is an explanatory diagram of a viewpoint tracing method, which is one of rendering methods.

Hereinafter, forms for carrying out the technology of the present disclosure (hereinafter, referred to as "embodiments") will be described in detail with reference to the drawings. The technology of the present disclosure is not limited to these embodiments. In the following description, the same reference numerals will be used for the same elements or elements having the same function and redundant description will be omitted. Description will be given in the following order.

1. General description of rendering system and automated driving verification system of present disclosure
2. Rendering system
3. Rendering system according to embodiment of present disclosure 3-1. First embodiment (example when lens model is interposed between image sensor model and rendering engine)
3-1-1. System configuration example
3-1-2. Drawing content determination method
3-1-3. Realization of wide dynamic range
3-2. Second embodiment (example when lens model is not interposed between image sensor model and rendering engine)
4. Automated driving verification system according to embodiment of present disclosure
4-1. Use case 1 (example when simulation technique is MILS/SILS)
4-2. Use case 2 (example 1 when simulation technique is HILS)
4-3. Use case 3 (example 2 when simulation technique is HILS)
5. Modification
6. Application examples
7. Configurations that can be adopted by present disclosure General Description of Rendering System of Present Disclosure In a rendering system of the present disclosure, an image sensor model can be configured to have a function of performing viewpoint tracing so that a trajectory of light reaching a viewpoint is traced back from the viewpoint to a light source. Further, the image sensor model can be configured to perform scanning in units of line blocks and provide information on a ray tracing direction and a ray tracing period to the rendering engine for each exposure position.

In the rendering system of the present disclosure including the preferred configuration described above, the rendering engine can be configured to calculate an arrival position of the ray based on the information on the ray tracing direction provided from the image sensor model to obtain a spectral reflectance of an object at the arrival position, and trace the ray in a reflection direction after reaching the object at the arrival position to obtain a spectral radiation amount of the reached light source. The rendering engine can be configured to obtain a spectral irradiance of a sensor image plane of the image sensor model based on the spectral reflectance of an object and a spectral radiation amount of the light source.

Further, in the rendering system of the present disclosure including the above-mentioned preferable configuration, the rendering system may be configured to have a lens model between the image sensor model and the rendering engine. At this time, the image sensor model can be configured to perform scanning in units of line blocks and provide information on a ray tracing direction and a ray tracing period to the lens model for each exposure position. Further, the lens model can be configured to calculate a ray tracing direction based on the information on the ray tracing direction provided from the image sensor model, and provide a calculation result to the rendering engine.

Further, in the rendering system of the present disclosure including the above-mentioned preferred configuration, the rendering engine can be configured to calculate the arrival position of a ray based on the calculation result for the ray tracing direction provided from the lens model to obtain a spectral reflectance of the object at the arrival position and trace a ray in a reflection direction after reaching the object at the arrival position to obtain the spectral radiation amount of the reached light source. The rendering engine can be configured to obtain the spectral irradiance of the sensor image plane of the image sensor model based on the spectral reflectance of the object and the spectral irradiance of the light source.

Further, in the rendering system of the present disclosure including the above-mentioned preferable configuration, the image sensor model can be configured to have an on-chip lens on a pixel and correct a viewpoint position based on a pupil correction shift amount of the on-chip lens with respect to the pixel. Further, the lens model can be configured to correct the viewpoint position based on the pupil correction shift amount of the on-chip lens.

In an automated driving verification system of the present disclosure, an image sensor model can be configured to have a function of performing viewpoint tracing so that a trajectory of light reaching a viewpoint is traced back from the viewpoint to a light source.

In the automated driving verification system of the present disclosure including the above-mentioned preferable configuration, the application processor can be configured to be mounted on a same image processing unit or a central processing unit as the image sensor model and the rendering engine to verify the mounted automated driving software.

Alternatively, in the automated driving verification system of the present disclosure including the above-mentioned preferable configuration, the image sensor model and the rendering engine can be configured to be mounted on the same image processing unit. Then, the application processor can be configured to be mounted on an electronic control unit that is electrically connected to the image processing unit via a camera interface to verify the mounted automated driving software.

Alternatively, in the automated driving verification system of the present disclosure including the preferred configuration described above, the image sensor model and the rendering engine can be configured to be mounted on separate image processing units that are electrically connected via a display interface. The application processor can be configured to be mounted on an electronic control unit that is electrically connected to the image processing unit on which the image sensor model is mounted via a camera interface to verify the mounted automated driving software.

<Rendering System>

In developing an automated driving system, an automated driving algorithm is verified by simulation in virtual space. An image sensor model is needed to verify the autonomous driving algorithm. The image sensor model is a sensor model that models an image sensor on software.

The rendering system of the present disclosure is an in-vehicle rendering system particularly suitable for use in verification of an automated driving algorithm. Here, "rendering" is to image information on an object or the like provided as numerical data by calculation. In a virtual-space automated driving verification, as a rendering method, for example, as shown in FIG. 1, a viewpoint tracing method of drawing by tracing a ray reaching the viewpoint in a reverse direction (cited reference: Internet <URL: https://www.scratchapixel.com/lessons/3d-basic-rendering/global-illumination-path-tracing>) can be used. FIG. 1 illustrates a case where the reflection of a ray emitted from a viewpoint (camera) up to three times is taken into consideration. According to the viewpoint tracing method, it is possible to precisely reproduce a shadow portion, a reflection of a puddle, and the like by CG (computer graphic) drawing.

The image sensor (imaging device) includes a sensor having a global shutter function that performs exposure on all pixels at the same timing to acquire pixel values, and a sensor having a rolling shutter function of performing exposure in units of line blocks using one or a plurality of pixel rows as one line block to acquire pixel values.

In an automated driving system, there is a tendency to use a sensor having a rolling shutter function has advantages such as excellent cost effectiveness and long exposure time as compared to a sensor having a global shutter function as an image sensor mounted on a vehicle. In this case, it is necessary to realize a rolling shutter for precise modeling. However, if full-screen drawing is performed with an increased time resolution in order to reproduce exposure in units of line blocks, the execution speed is significantly reduced and drawing takes time.

Figure 2:
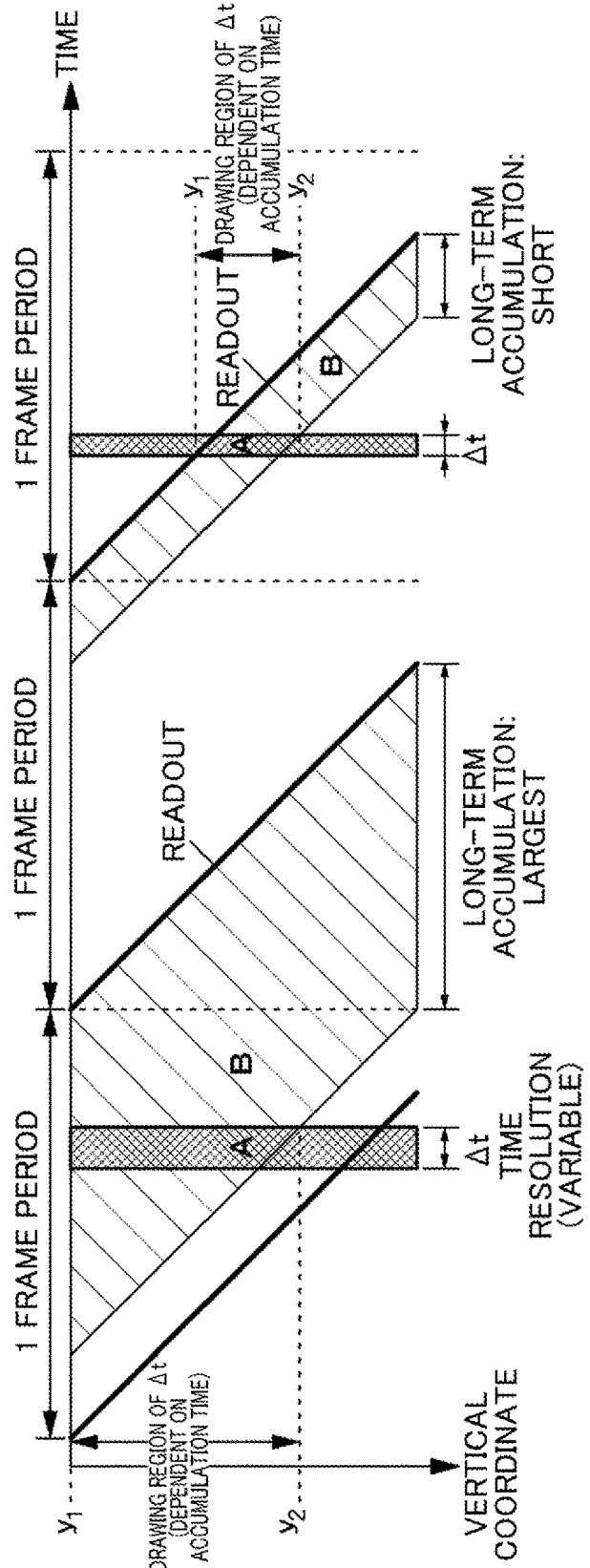
FIG. 2 is a timing chart provided for explaining a conventional rolling shutter (line exposure).

FIG. 2 shows a timing chart provided to explain a conventional rolling shutter (line exposure) in which exposure is performed in units of line blocks. In the timing chart of FIG. 2, A is a drawing range of a certain unit time (that is, a variable time resolution $\Delta t$), and a range covering the accumulation time of B is drawn and added. In the drawing range A, the region of the vertical coordinates $y_1$ to $y_2$ becomes the drawing region of the time resolution $\Delta t$ that depends on the accumulation time.

<Rendering System According to Embodiment of Present Disclosure>

A rendering system according to the embodiment of the present disclosure is, for example, a system for virtual-space automated driving verification, and includes an image sensor model having a rolling shutter function and a rendering engine that processes and draws image data.

Then, in the rendering system according to the present embodiment, the image sensor model uses a well-known viewpoint tracing method (see FIG. 1) to control the rendering engine so that only the region of the line block being exposed is drawn. In this way, by limiting the drawing region when drawing with the rendering engine to the exposure position of the line block under the control of the image sensor model, the drawing time can be shortened as compared to the case of full-screen drawing where one screen is drawn together.

The rolling shutter is, for example, a shutter operation in which exposure is sequentially performed in units of one pixel row, that is, in units of one line, to acquire pixel values. However, the rolling shutter is not limited to exposure in units of one line, and may be a shutter operation in which exposure is performed in units of line blocks using a plurality of pixel rows as one line block. Hereinafter, for easy understanding, a rolling shutter that performs a shutter operation in which exposure is sequentially performed in units of one line will be described, and exposure in units of one line may be referred to as "line exposure".

In the rolling shutter operation, the accumulation time is divided within an allowable moving object blur time, the signal level is obtained by accumulating for the divided time, and the signal level is added over the accumulation time of the pixels.

Hereinafter, specific examples of the embodiments of the present disclosure for limiting the drawing region to the exposure position of the line block and shortening the drawing time will be described.

First Embodiment

Figure 3:
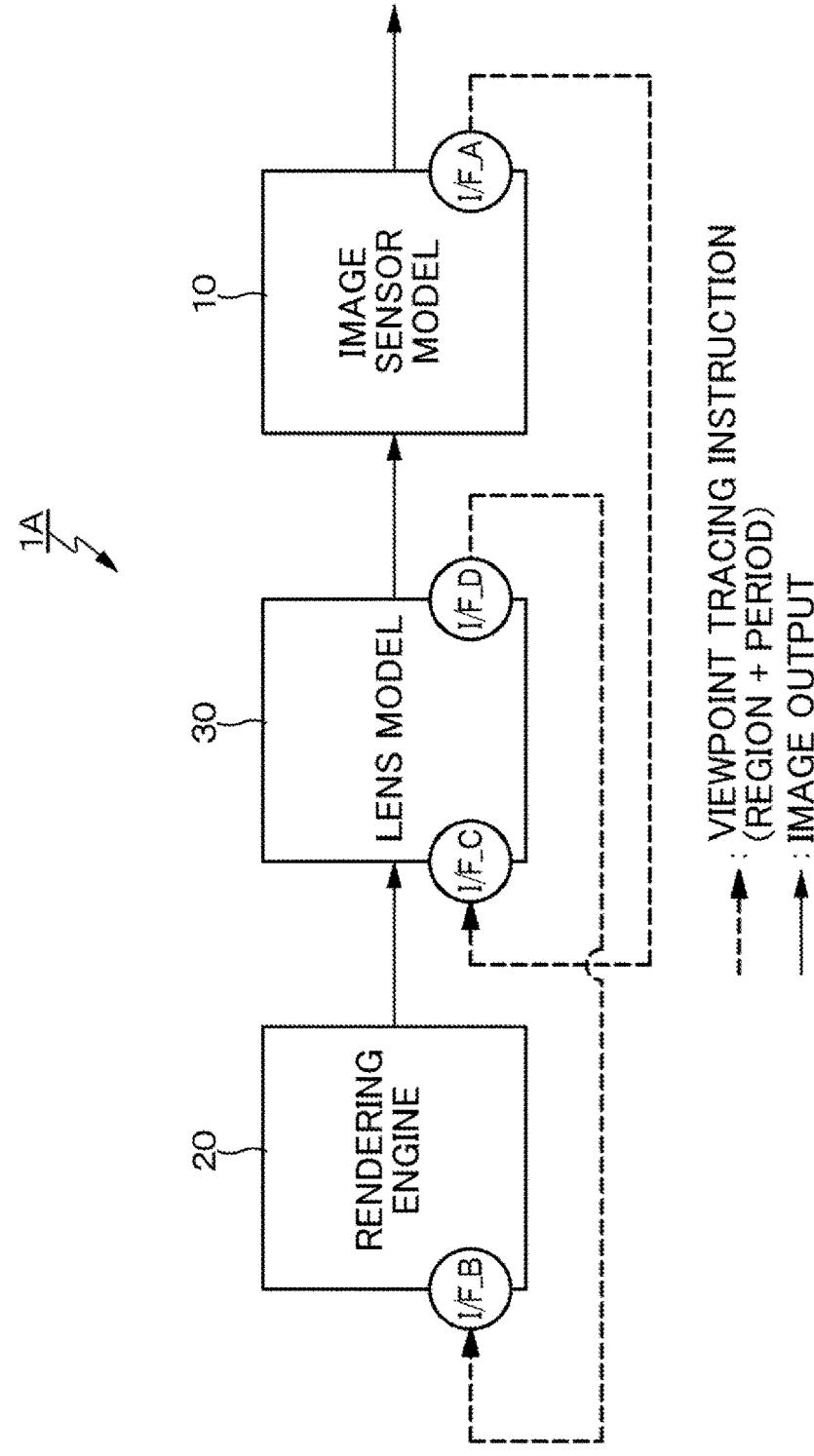
FIG. 3 is a block diagram showing a configuration example of a rendering system according to a first embodiment.

The first embodiment is an example in which there is a lens model between an image sensor model and a rendering engine. FIG. 3 shows a block diagram of a configuration example of a rendering system according to the first embodiment.

System Configuration Example

As shown in FIG. 3, a rendering system 1A according to the first embodiment includes an image sensor model 10 and a rendering engine 20, and also includes a lens model 30 interposed between the image sensor model 10 and the rendering engine 20. The image sensor model 10 includes an output interface I/F_A. The rendering engine 20 includes an input interface I/F_B. The lens model 30 includes an input interface I/F_C and an output interface I/F_D.

In the rendering system 1A according to the first embodiment having the above-mentioned configuration, the image sensor model 10 has a rolling shutter function and a function of performing viewpoint tracing according to a viewpoint tracing method. In the viewpoint tracing method, drawing is performed by tracing the trajectory of a ray reaching each pixel of the image sensor model 10 which is a viewpoint so as to trace back from the viewpoint to a light source.

The image sensor model 10 performs scanning sequentially in units of one line block (in this example, in units of one line), and transmits information on a ray tracing direction and a ray tracing period from the output interface I/F_A to the lens model 30 in the previous stage for each line exposure position as a control signal. The ray tracing direction is specified in consideration of the internal sensor information such as a pixel and an on-chip lens.

The lens model 30 receives the control signal transmitted from the image sensor model 10, that is, the information on the ray tracing direction and the ray tracing period via the input interface I/F_C. Then, the lens model 30 calculates the ray tracing direction based on the received control signal, and transmits information on the calculated ray tracing direction from the output interface I/F_D to the rendering engine 20 in the previous stage as a control signal.

The rendering engine 20 receives the control signal transmitted from the lens model 30, that is, the information on the ray tracing direction obtained by calculation via the input interface I/F_B. Then, the rendering engine 20 calculates the arrival position of the ray emitted from the image sensor model 10 based on the received control signal, that is, the information of the ray tracing direction, to obtain the spectral reflectance of an object that the ray has reached.

The rendering engine 20 further traces a ray in the reflection direction after reaching the object to obtain the spectral radiation amount of the reached light source. Then, the rendering engine 20 obtains the spectral irradiance of the sensor image plane of the image sensor model 10 based on the spectral reflectance of the object that the ray has reached and the spectral irradiance of the light source. It is possible to obtain not only the spectral irradiance but also the radiant flux and the radiance.

According to the rendering system 1A according to the first embodiment having the above-mentioned configuration, the drawing region of the rendering engine 20 can be limited to only the line-exposed region under the control of the image sensor model 10, so that the drawing time can be shortened as compared to the case of full-screen drawing.

Figure 4:
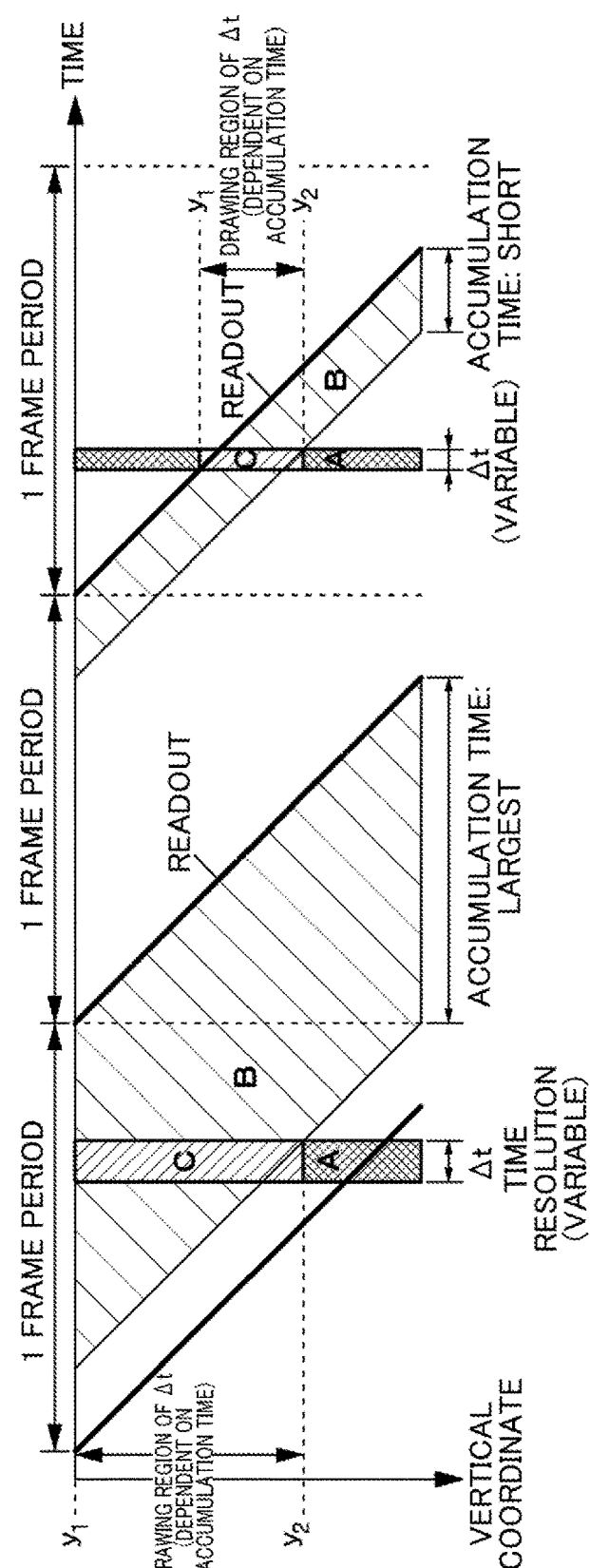
FIG. 4 is a timing chart provided for explaining rolling shutter (line exposure) executed in an image sensor model of the rendering system according to the first embodiment.

FIG. 4 is a timing chart provided for explaining rolling shutter (line exposure) executed in the image sensor model 10 of the rendering system 1A according to the first embodiment.

In the timing chart of FIG. 4, the time $\Delta t$ in the region A is a time resolution, and the time is variable. The section of region B is an accumulation section of long-term accumulation. Further, region C is an example of a drawing region. In the drawing region C, the region of the vertical coordinates $y_1$ to $y_2$ is a drawing region having a time resolution $\Delta t$ that depends on the accumulation time.

As is clear from the timing chart of FIG. 4, in the rendering system 1A according to the first embodiment, the rendering engine performs drawing only in the portion C where the time resolution $\Delta t$ and the section of the region B overlap, that is, the line-exposed range under the control of the image sensor model 10.

(Drawing Content Determination Method)

Next, a drawing content determination method executed in the rendering system 1A according to the first embodiment will be described. The flowchart of FIG. 5 shows the processing flow of the drawing content determination method in the rendering system 1A according to the first embodiment.

Figure 6:
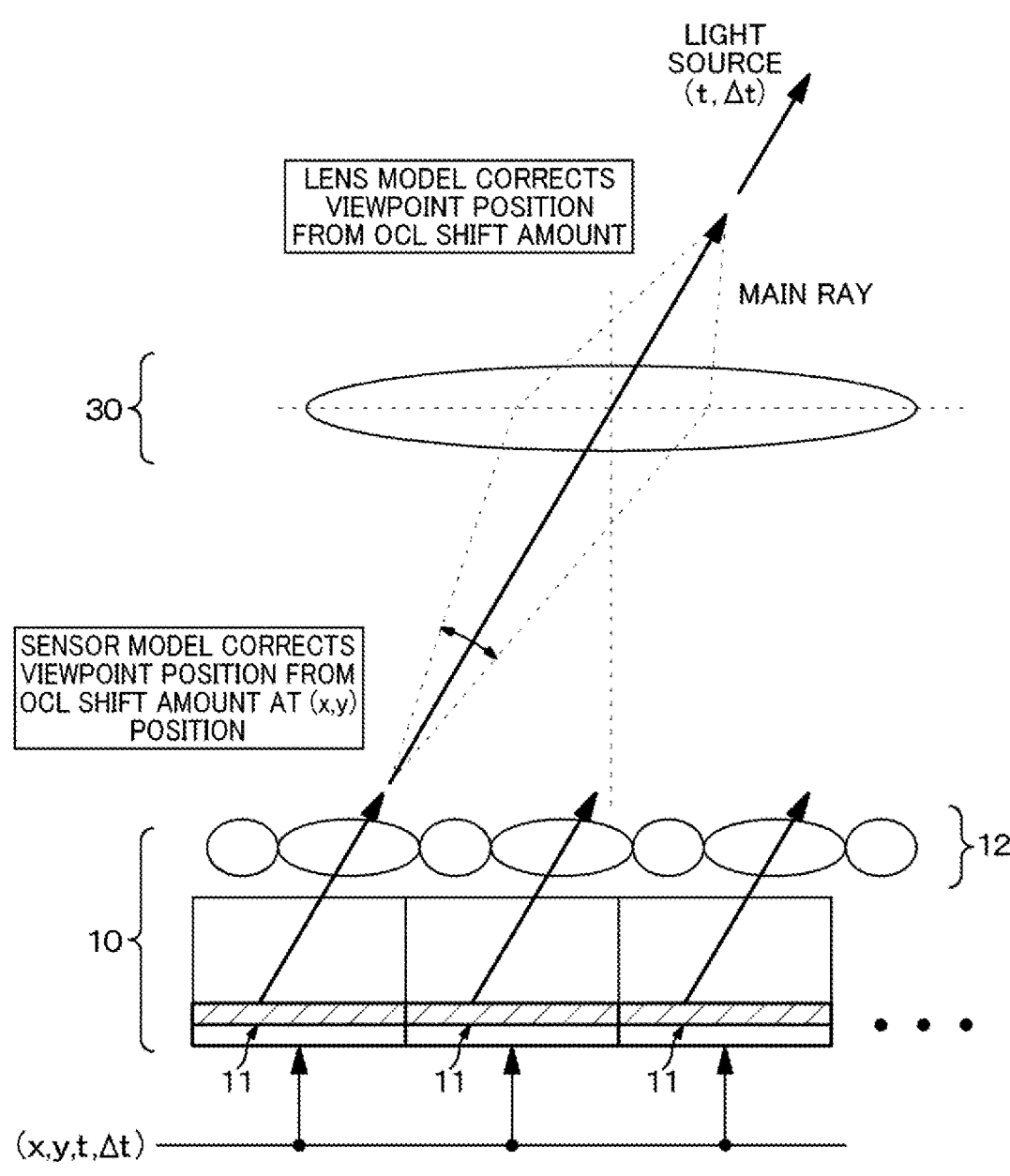
FIG. 6 is an explanatory diagram of viewpoint tracing in the rendering system according to the first embodiment.

Further, FIG. 6 shows an explanatory diagram of viewpoint tracing in the rendering system 1A according to the first embodiment. As shown in FIG. 6, the image sensor model 10 has a configuration in which pixels 11 are arranged, and further, an on-chip lens 12 is arranged on the pixels 11 so as to correspond to the pixel 11. In this image sensor model 10, each pixel 11 is a viewpoint. In FIG. 6, the on-chip lens 12 is abbreviated as "OCL". The ray tracing direction is defined in consideration of the internal sensor information such as the pixel 11 and the OCL 12.

Figure 5:
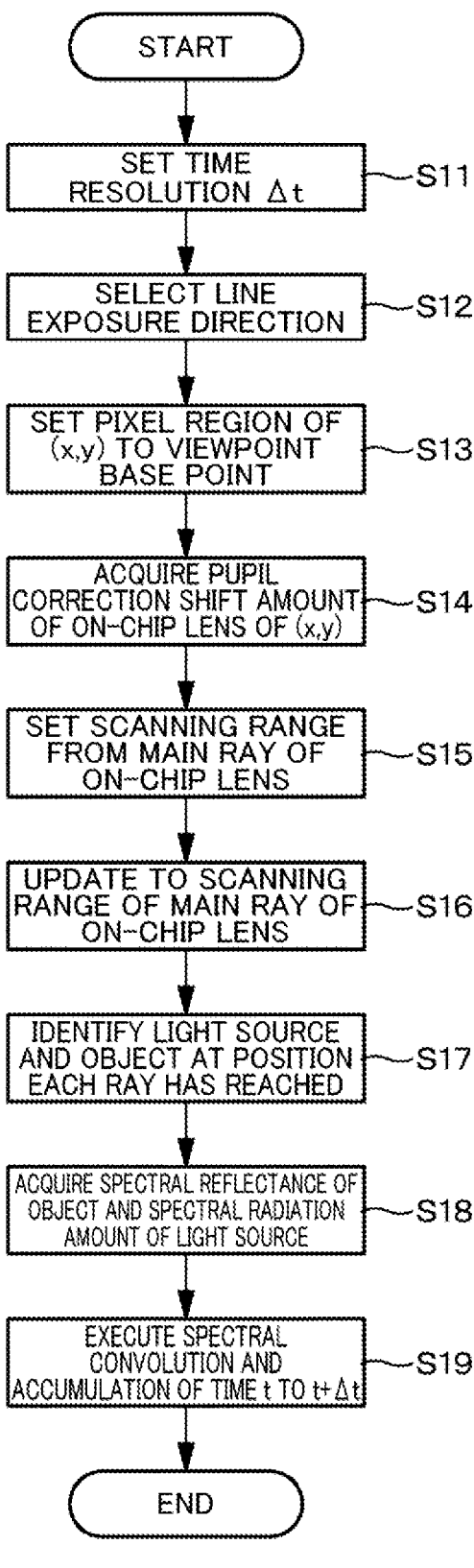
FIG. 5 is a flowchart showing a processing flow of a drawing content determination method executed in the rendering system according to the first embodiment.

In the flowchart of FIG. 5, first, the image sensor model 10 sets the time resolution $\Delta t$ (step S11), then selects a line exposure direction (vertical coordinates $y_1$ to $y_2$ overlapping the time t to t+$\Delta t$) (step S12), and then sets a pixel region at the coordinate (x,y) position as a viewpoint base point (step S13).

Next, the image sensor model 10 acquires a pupil correction shift amount of the on-chip lens 12 corresponding to the coordinate (x,y) position of the viewpoint (step S14), then sets the scanning range from the main ray of the on-chip lens 12 (step S15), and then updates to the scanning range of the main ray of the lens model 30 (step S16).

That is, in the image sensor model 10, the viewpoint position is corrected based on the pupil correction shift amount of the on-chip lens 12 with respect to the pixel 11 at the coordinate (x,y) position of the viewpoint. Further, also in the lens model 30, the viewpoint position is corrected based on the pupil correction shift amount of the on-chip lens 12 with respect to the pixel 11.

Next, the rendering engine 20 identifies a light source and an object at a position that each ray emitted from the light source has reached (step S17), then acquires the spectral reflectance of the object that the ray has reached and the spectral radiation amount of the light source (step S18), and then executes spectral convolution and accumulation of time t to t+$\Delta t$ (step S19).

The rendering content in the rendering system 1A according to the first embodiment can be determined by a series of processes by the image sensor model 10, the rendering engine 20, and the lens model 30 described above.

(Realization of Wide Dynamic Range)

By the way, for example, an in-vehicle camera (image sensor) is required to be able to shoot a wide (high) dynamic range image with high image quality even in a scene having a large difference in brightness such as an entrance/exit of a tunnel in the daytime.

As a method for realizing a wide dynamic range, for example, the following two methods can be exemplified. However, the method is not limited to the following two methods, and for example, a method in which the two methods are combined may be used.

One of them is a method that realizes a wide dynamic range (hereinafter referred to as DOL (Digital Over Lap) method) by obtaining a plurality of signals having different exposure times in one frame, for example, two signals of relatively long-term accumulation and relatively short-term accumulation, and synthesizing them.

The other method is a method that realizes a wide dynamic range (hereinafter referred to as a sub-pixel structure method) by dividing one pixel into a plurality of sub-pixels having different areas, for example, dividing two sub-pixels such as a sub-pixel having a relatively large area and a sub-pixel having a relatively small area, to obtain two signals having different sensitivities and synthesizing them.

Example of Wide Dynamic Range Realized by DOL Method

The rolling shutter (line exposure) executed in the image sensor model 10 that employs the wide dynamic range of the DOL method will be described with reference to the timing chart of FIG. 7.

Figure 7:
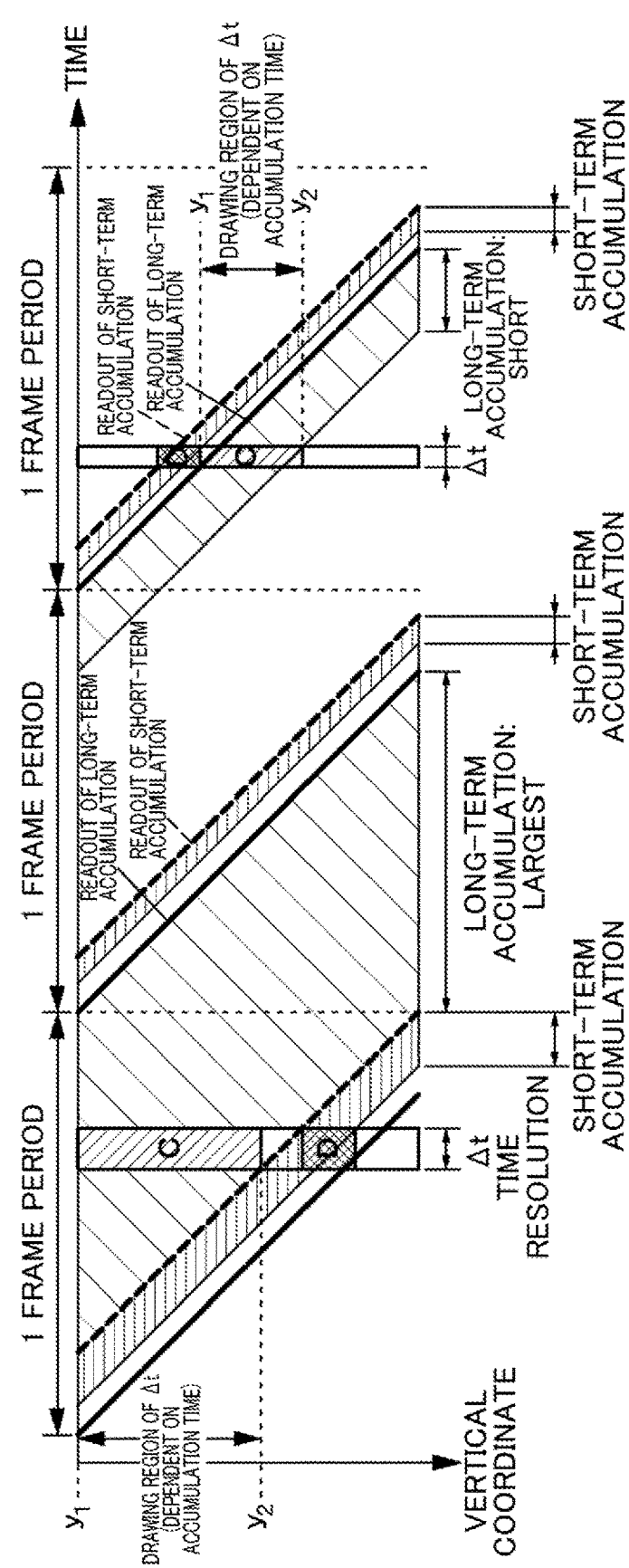
FIG. 7 is a timing chart provided for explaining rolling shutter (line exposure) executed in an image sensor model that employs a wide dynamic range realized with the DOL method.

As shown in the timing chart of FIG. 7, in the image sensor model 10 that employs the wide dynamic range realized with the DOL method, for example, two signals having different exposure times in one frame, that is, a signal of relatively long-term accumulation and a signal of relatively short-term accumulation, are obtained. Then, in the time of the time resolution $\Delta t$, drawing is performed only in the region C that overlaps with the section of long-term accumulation and the region D that overlaps with the section of short-term accumulation.

Example of Wide Dynamic Range Realized with Sub-Pixel Structure Method

Figures 8A, 8B:
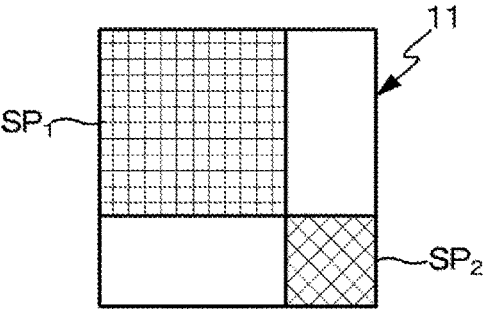
[FIGS. 8A and 8B]

In the image sensor model 10 that employs a wide dynamic range realized with the sub-pixel structure method, for example, as shown in FIG. 8A, one pixel 11 is divided into two sub-pixels having different areas, that is, two sub-pixels including a sub-pixel $SP_1$ having a relatively large area and a sub-pixel $SP_2$ having a relatively small area. The sub-pixel $SP_1$ having a relatively large area is a high-sensitivity sub-pixel, and the sub-pixel $SP_2$ having a relatively small area is a low-sensitivity sub-pixel. Then, a wide dynamic range is realized by obtaining two signals having different sensitivities are obtained from these two sub-pixels $SP_1$ and $SP_2$, and synthesizing them.

Figure 9:
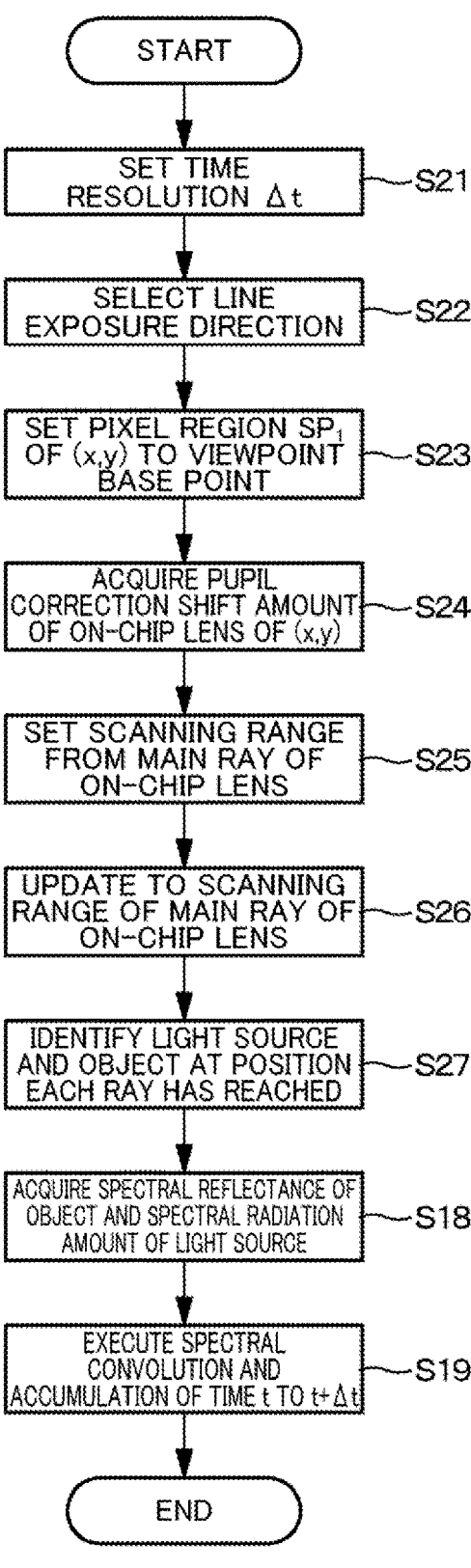
FIG. 9 is a flowchart showing a processing flow of a drawing content determination method executed in a rendering system that employs a wide dynamic range of the sub-pixel structure method.

FIG. 8B is an explanatory diagram of viewpoint tracing in the rendering system 1A in the case of realizing a wide dynamic range with the sub-pixel structure method, and FIG. 9 is a flowchart showing the processing flow of the drawing content determination method.

First, the image sensor model 10 sets the time resolution $\Delta t$ (step S21), then selects a line exposure direction (vertical coordinates $y_1$ to $y_2$ overlapping the time t to t+$\Delta t$) (step S22), and then sets the pixel region of the sub-pixel $SP_1$ at the coordinate (x,y) position as a viewpoint base point (step S23). That is, in the case of the sub-pixel structure method, the viewpoint base point is determined according to the positions of the high-sensitivity and low-sensitivity sub-pixels.

Here, in the image sensor model 10, the viewpoint position is corrected based on the pupil correction shift amount of the on-chip lens 12 with respect to the sub-pixel SP₁ at the coordinate (x,y) position of the viewpoint. Further, also in the lens model 30, the viewpoint position is corrected based on the pupil correction shift amount of the on-chip lens 12 with respect to the sub-pixel SP₁.

Next, the image sensor model 10 acquires the pupil correction shift amount of the on-chip lens 12 corresponding to the coordinate (x,y) position of the viewpoint (step S24), then sets the scanning range from the main ray of the on-chip lens 12 (step S25), and then updates to the scanning range of the main ray of the lens model 30 (step S26).

Next, the rendering engine 20 identifies a light source and an object at a position that each ray emitted from the light source has reached (step S27), then acquires the spectral reflectance of the object that the light source has reached and the spectral radiation amount of the light source (step S28), and then executes spectral convolution and accumulation of time t to t+Δt (step S29).

In the rendering system 1A in the case of realizing the wide dynamic range with the sub-pixel structure method, the drawing content can be determined by a series of processing by the image sensor model 10, the rendering engine 20, and the lens model 30 described above.

Second Embodiment

Figure 10:
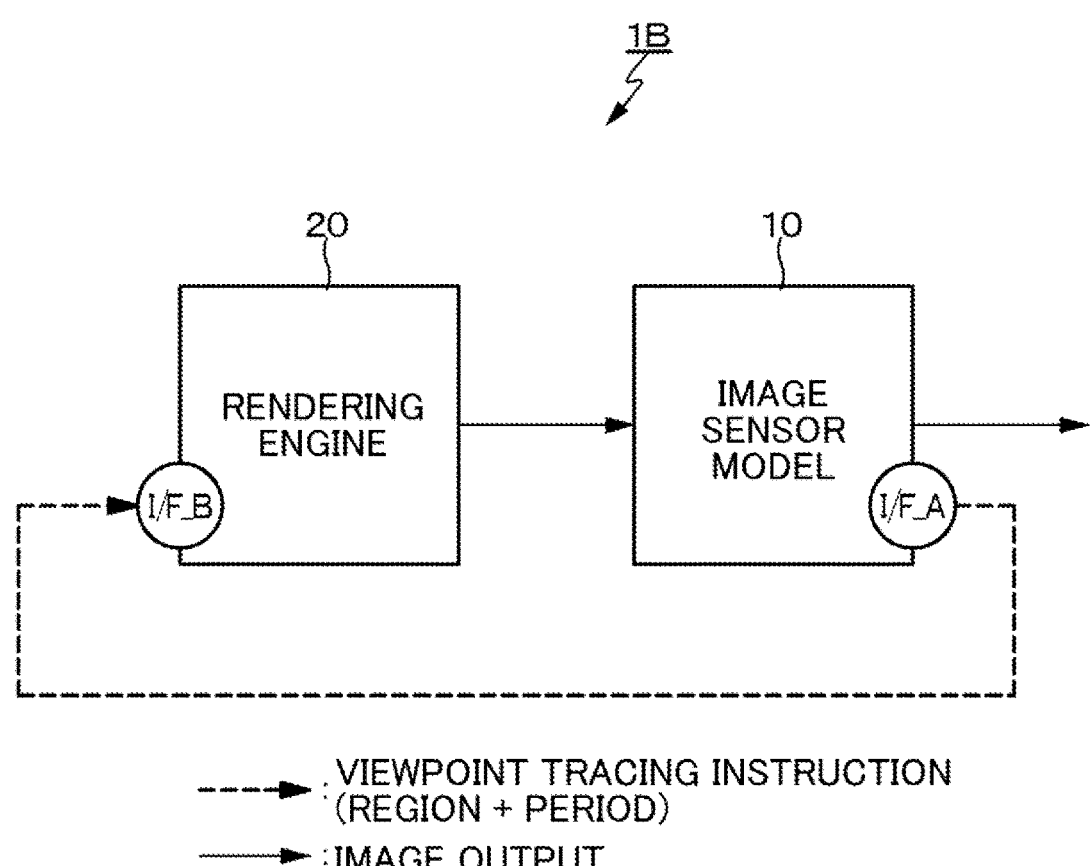
FIG. 10 is a block diagram showing a configuration example of a rendering system according to a second embodiment.

The second embodiment is an example in which the lens model is not interposed between the image sensor model and the rendering engine. FIG. 10 shows a block diagram of a configuration example of the rendering system according to the second embodiment.

System Configuration Example

As shown in FIG. 10, a rendering system 1B according to the second embodiment has a configuration including an image sensor model 10 and a rendering engine 20. The image sensor model 10 includes an output interface I/F_A. The rendering engine 20 includes an input interface I/F_B.

The image sensor model 10 has a rolling shutter function and a function of performing viewpoint tracing according to the viewpoint tracing method, as in the case of the rendering system 1A according to the first embodiment. The image sensor model 10 performs scanning sequentially in units of one line, and outputs information on the ray tracing direction and the ray tracing period from the output interface I/F_A to the rendering engine 20 for each line exposure position as a control signal.

The rendering engine 20 receives the control signal transmitted from the image sensor model 10, that is, the information on the ray tracing direction and the ray tracing period via the input interface I/F_B. The rendering engine 20 calculates the arrival position of the ray emitted from the image sensor model 10 based on the received information on the ray tracing direction to obtain the spectral reflectance of the object that the ray has reached.

The rendering engine 20 further traces a ray in the reflection direction after reaching the object to obtain the spectral radiation amount of the reached light source. Then, the rendering engine 20 obtains the spectral irradiance of the sensor image plane of the image sensor model 10 based on the spectral reflectance of the object that the ray has reached and the spectral irradiance of the light source. It is possible to obtain not only the spectral irradiance but also the radiant flux and the radiance.

The rolling shutter (line exposure) executed in the image sensor model 10 of the rendering system 1B according to the second embodiment having the above-mentioned configuration and the drawing content determination method are the same as those of the rendering system 1A according to the first embodiment. Therefore, the description thereof will be omitted. Further, realization of the wide dynamic range is the same as in the case of the rendering system 1A according to the first embodiment.

According to the rendering system 1B according to the second embodiment having the above-mentioned configuration, although the lens model corresponding to the lens model 30 of FIG. 3 does not exist, as in the case of the rendering system 1A according to the first embodiment, the drawing region of the rendering engine 20 can be limited to only the line-exposed region, so that the drawing time can be shortened as compared to the case of full-screen drawing.

<Automated Driving Verification System According to Embodiment of Present Disclosure>

The rendering system according to the embodiment of the present disclosure described above can construct an automated driving verification system that verifies an automated driving algorithm by being used in combination with software on a post-stage chip (application processor) that performs image recognition using the output of the image sensor model 10 as an input.

The use cases of the rendering system according to the embodiment of the present disclosure in constructing the automated driving verification system will be described below. Here, three use cases of Use case 1, Use case 2, and Use case 3 are illustrated.

[Use Case 1]

Figure 11:
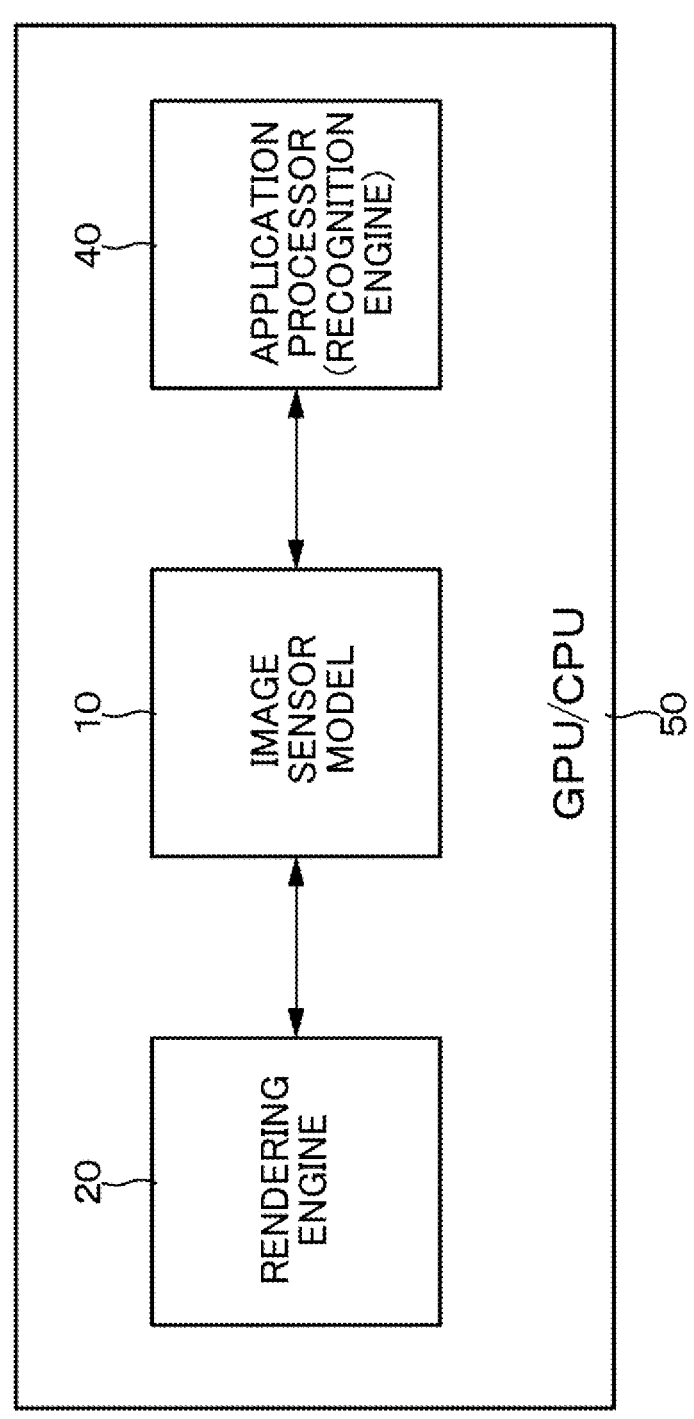
FIG. 11 is a block diagram showing a configuration example of the automated driving verification system according to Use case 1.

Use case 1 is an example in which a simulation technique is MILS (Model In The Loop Simulation)/SILS (Software In The Loop Simulation). FIG. 11 shows a block diagram of a configuration example of the automated driving verification system according to Use case 1.

The automated driving verification system according to Use case 1 has a system configuration in which an application processor 40 is mounted on the same GPU (Graphics Processing Unit) or CPU (Central Processing Unit) 50 as the image sensor model 10 and the rendering engine 20, and the automated driving software installed in the application processor 40 is verified.

In the automated driving verification system according to Use case 1 of the above-mentioned system configuration, an actual machine operation is reproduced by transmitting information from the image sensor model 10 to the rendering engine 20. Further, by transmitting the exposure timing from the image sensor model 10 to the rendering engine 20, the flicker timing and blur of the LED (light emitting diode) are accurately reproduced. Incidentally, the LED traffic light and the sign are blinking periodically, and if the lighting timing and the exposure timing of the image sensor do not match, the lighting period cannot be captured and the light is turned off. When this happens, the LED traffic light or the sign may not be recognized correctly. Further, the blur is a moving object blur, and when the accumulation time is long, the moving object may be blurred and may not be recognized correctly.

For example, when the rendering engine 20 generates three primary color signals of R (red), G (green), and B (blue), the sensor color reproduction cannot be faithfully reproduced, but by transmitting the sensor spectral characteristics from the image sensor model 10 to the rendering engine 20, it is possible to faithfully reproduce the sensor color. However, the calculation of the sensor spectral characteristics may be performed by the image sensor model 10.

A simulated image is input from the rendering engine 20 to the image sensor model 10. The image sensor model 10 supplies the input image from the rendering engine 20 to the application processor 40 as an image to which noise and sensor characteristics are added. The application processor 40 is mounted with verification target automated driving software, and verifies the automated driving software.

[Use Case 2]

Figure 12:
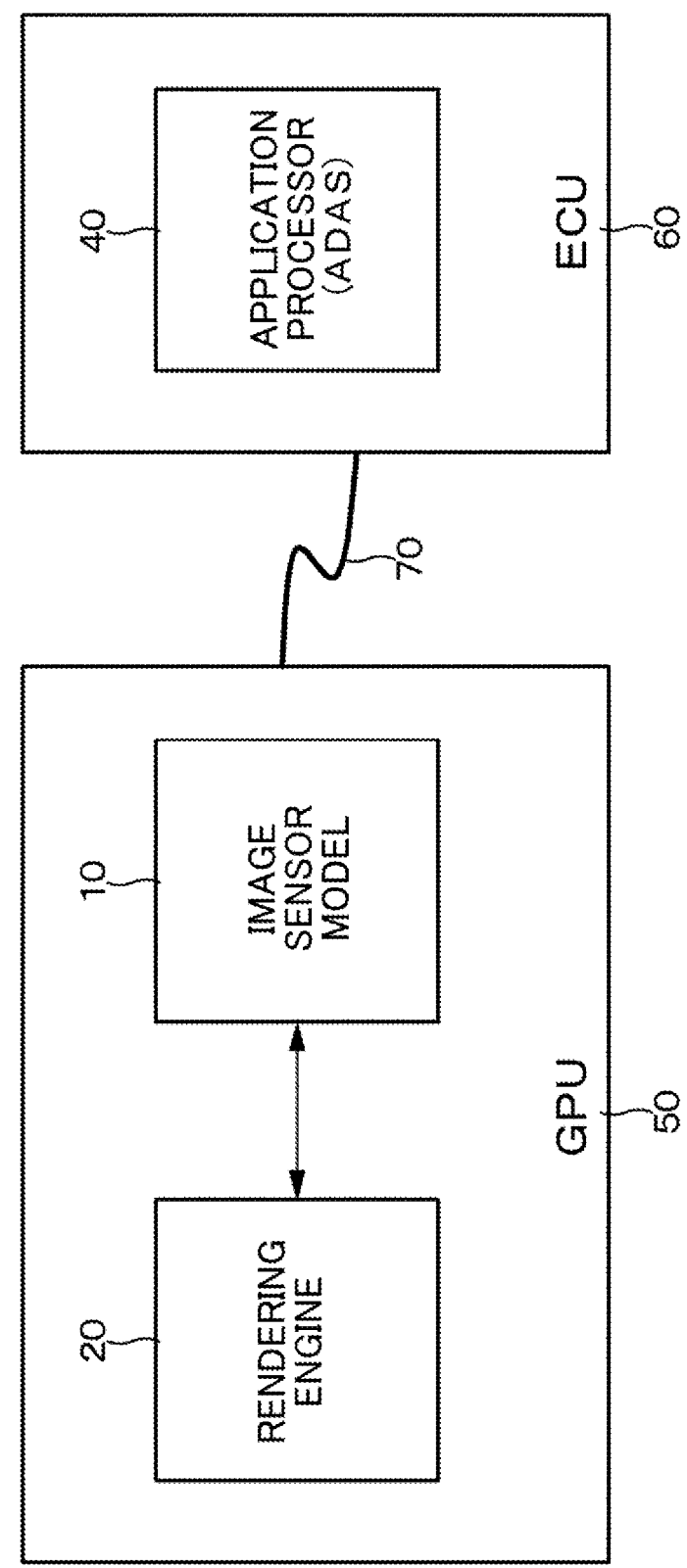
FIG. 12 is a block diagram showing a configuration example of an automated driving verification system according to Use case 2.

Use case 2 is an example (example 1) when the simulation technique is HILS (Hardware In The Loop Simulation). FIG. 12 shows a block diagram of a configuration example of the automated driving verification system according to Use case 2.

The automated driving verification system according to Use case 2 has a system configuration in which the image sensor model 10 and the rendering engine 20 are mounted on the same GPU (image processing unit) 50, the application processor 40 constituting the advanced driver-assistance systems (ADAS), automated driving systems (AD), or autonomous driving (AD) systems is mounted on an ECU (Electronic Control Unit) 60, and the processing of the application processor 40 is executed on the ECU 60, and automated driving is verified. The GPU 50 and the ECU 60 are electrically connected to each other via a camera I/F (interface) 70 such as SERDES and MIPI.

In the automated driving verification system according to Use case 2 of the above-mentioned system configuration, an actual machine operation is reproduced by transmitting information from the image sensor model 10 to the rendering engine 20. Further, by transmitting the exposure timing from the image sensor model 10 to the rendering engine 20, the flicker timing and blur of the LED (light emitting diode) are accurately reproduced.

For example, when the rendering engine 20 generates three primary color signals of R, G, and B, the sensor color reproduction cannot be faithfully reproduced, but by transmitting the sensor spectral characteristics from the image sensor model 10 to the rendering engine 20, it is possible to faithfully reproduce the sensor color. However, the calculation of the sensor spectral characteristics may be performed by the image sensor model 10.

A simulated image is input from the rendering engine 20 to the image sensor model 10. The image sensor model 10 performs processing such as coding according to the actual speed of the vehicle on the input image from the rendering engine 20, and supplies the input image to the application processor 40 on the ECU 60 through the camera I/F 70. The application processor 40 is mounted with verification target automated driving software, and verifies the automated driving software.

[Use Case 3]

Figure 13:
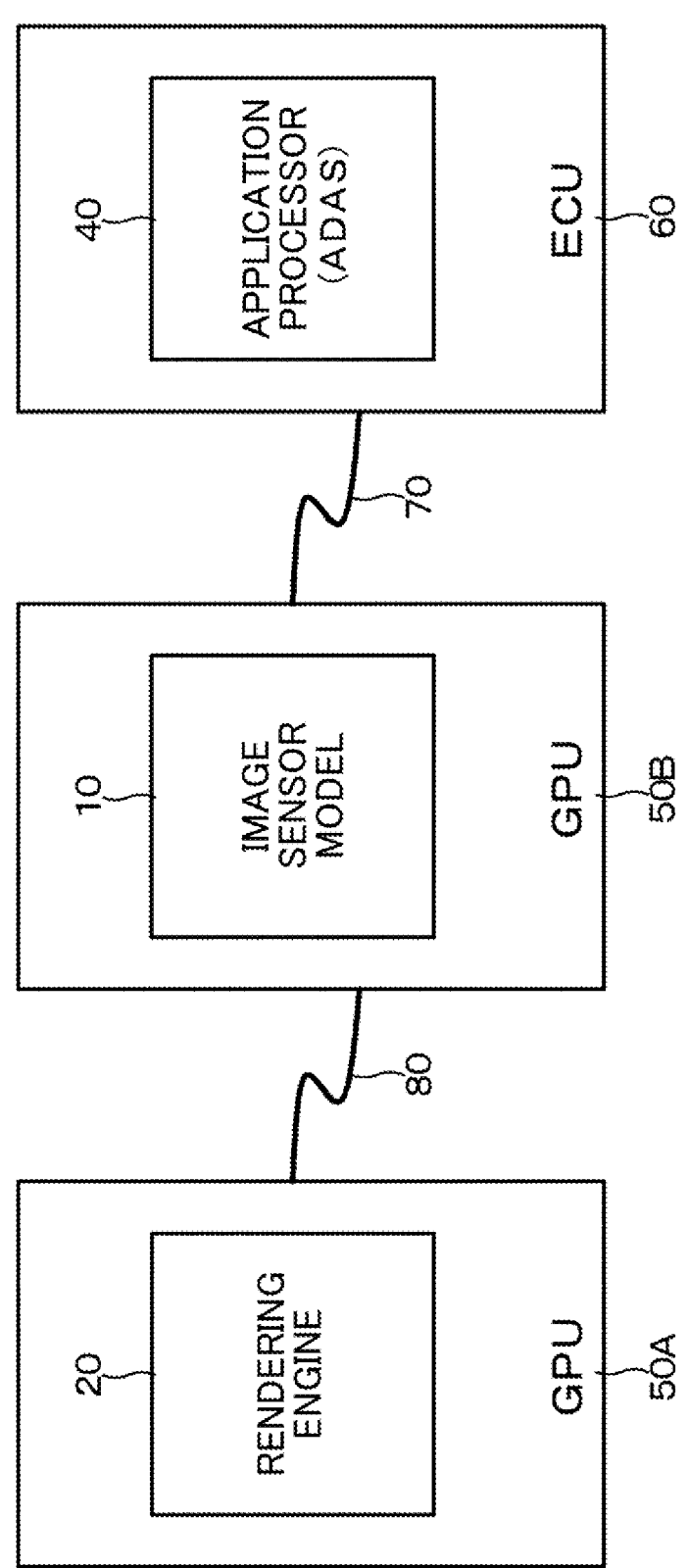
FIG. 13 is a block diagram showing a configuration example of an automated driving verification system according to Use case 3.

Use case 3 is an example (example 2) when the simulation technique is HILS (Hardware In The Loop Simulation). FIG. 13 shows a block diagram of a configuration example of the automated driving verification system according to Use case 3.

The automated driving verification system according to Use case 3 has a system configuration in which the image sensor model 10 and the rendering engine 20 are mounted on separate GPUs (image processing units) 50A and 50B, the application processor 40 constituting the advanced driver-assistance systems (ADAS), automated driving systems (AD), or autonomous driving systems (AD) is mounted on an ECU (Electronic Control Unit) 60, and the processing of the application processor 40 is executed on the ECU 60, and automated driving is verified. The GPU 50A and the GPU 50B are connected via a display I/F (interface) 80 such as HDMI (registered trademark) and DisplayPort. The GPU 50B and the ECU 60 are electrically connected to each other via a camera I/F 70 such as SERDES or MIPI.

In the automated driving verification system according to Use case 3 having the above-mentioned configuration, information cannot be transmitted from the image sensor model 10 to the rendering engine 20. (However, this does not apply if the image sensor model 10 has an interface to the rendering engine 20 other than the display I/F 80.) Therefore, the rendering engine 20 secures a medium degree of reproducibility by approximating the phenomenon with metadata. The application processor 40 is mounted with verification target automated driving software, and verifies the automated driving software.

Regarding the blur and the flicker timing of the LED, the degree of blurring and the LED lighting period are approximated using the phase difference and the speed between the image sensor model 10 and the light source and the moving object as variables. Further, by providing the rendering engine 20 with the sensor spectral characteristics in advance, the sensor color reproduction can be faithfully performed.

<Modification>

The technique according to the present disclosure was described on the basis of the preferred embodiments. The technique according to the present disclosure is not limited to the embodiments. The configurations and structures of the imaging device described in the embodiments are merely exemplary and thus can be changed as needed.

Application Examples

The technology according to the present disclosure can be applied to various products. For example, the technology according to the present disclosure can be used for verification of automated driving algorithm for any type of moving objects such as an automobile, an electric vehicle, a hybrid electric vehicle, a motorcycle, a bicycle, a personal mobility, an airplane, a drone, a ship, a robot, a construction machine, and an agricultural machine (tractor).

Figure 14:
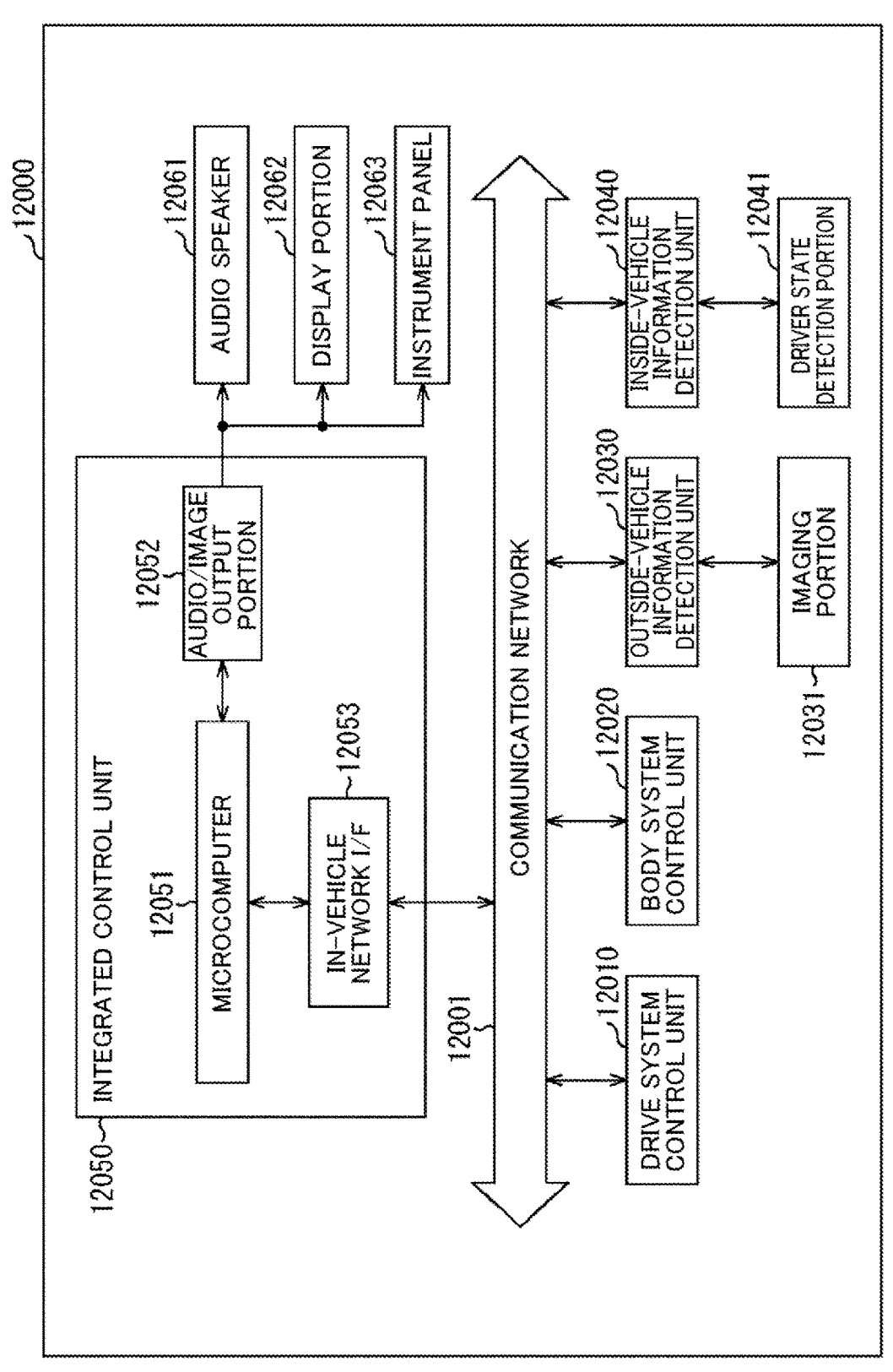
FIG. 14 is a block diagram showing a schematic configuration example of a vehicle control system which is an example of a moving body control system to which the technology according to the present disclosure can be applied.

FIG. 14 is a block diagram showing a schematic configuration example of a vehicle control system which is an example of a moving body control system to which the technology according to the present disclosure can be applied.

The vehicle control system 12000 includes a plurality of electronic control units connected thereto via a communication network 12001. In the example illustrated in FIG. 14, the vehicle control system 12000 includes a drive system control unit 12010, a body system control unit 12020, an outside-vehicle information detection unit 12030, an inside-vehicle information detection unit 12040, and an integrated control unit 12050. In addition, as a functional configuration of the integrated control unit 12050, a microcomputer 12051, an audio/image output portion 12052, and an in-vehicle network interface (I/F) 12053 are shown.

The drive system control unit 12010 controls an operation of an apparatus related to a drive system of a vehicle according to various programs. For example, the drive system control unit 12010 functions as a driving force generator for generating a driving force of a vehicle such as an internal combustion engine or a driving motor, a driving force transmission mechanism for transmitting a driving force to wheels, a steering mechanism for adjusting a turning angle of a vehicle, and a control apparatus such as a braking apparatus that generates a braking force of a vehicle.

The body system control unit 12020 controls operations of various devices mounted in the vehicle body according to various programs. For example, the body system control unit 12020 functions as a control device of a keyless entry system, a smart key system, a power window device, or various lamps such as a headlamp, a back lamp, a brake lamp, a turn signal, and a fog lamp. In this case, radio waves transmitted from a portable device that substitutes for a key or signals of various switches may be input to the body system control unit 12020. The body system control unit 12020 receives inputs of the radio waves or signals and controls a door lock device, a power window device, and a lamp of the vehicle.

The outside-vehicle information detection unit 12030 detects information on the outside of the vehicle having the vehicle control system 12000 mounted thereon. For example, an imaging portion 12031 is connected to the outside-vehicle information detection unit 12030. The outside-vehicle information detection unit 12030 causes the imaging portion 12031 to capture an image of the outside of the vehicle and receives the captured image. The outside-vehicle information detection unit 12030 may perform object detection processing or distance detection processing for peoples, cars, obstacles, signs, and letters on the road on the basis of the received image.

The imaging portion 12031 is an optical sensor that receives light and outputs an electrical signal according to the amount of the received light. The imaging portion 12031 can also output the electrical signal as an image or distance measurement information. In addition, the light received by the imaging portion 12031 may be visible light or invisible light such as infrared light.

The inside-vehicle information detection unit 12040 detects information on the inside of the vehicle. For example, a driver state detection portion 12041 that detects a driver's state is connected to the inside-vehicle information detection unit 12040. The driver state detection portion 12041 includes, for example, a camera that captures an image of a driver, and the inside-vehicle information detection unit 12040 may calculate a degree of fatigue or concentration of the driver or may determine whether or not the driver is dozing on the basis of detection information input from the driver state detection portion 12041.

The microcomputer 12051 can calculate a control target value of the driving force generation device, the steering mechanism, or the braking device on the basis of information acquired by the outside-vehicle information detection unit 12030 or the inside-vehicle information detection unit 12040 inside and outside the vehicle, and output a control command to the drive system control unit 12010. For example, the microcomputer 12051 can perform cooperative control for the purpose of implementing functions of an ADAS (advanced driver assistance system) including vehicle collision avoidance, impact mitigation, following traveling based on an inter-vehicle distance, vehicle speed maintenance driving, vehicle collision warning, and vehicle lane deviation warning.

Further, the microcomputer 12051 can perform cooperative control for the purpose of automated driving or the like in which autonomous travel is performed without depending on operations of the driver, by controlling the driving force generator, the steering mechanism, or the braking device and the like on the basis of information about the surroundings of the vehicle, the information being acquired by the outside-vehicle information detection unit 12030 or the inside-vehicle information detection unit 12040.

In addition, the microcomputer 12051 can output a control command to the body system control unit 12020 based on the information acquired by the outside-vehicle information detection unit 12030 outside the vehicle. For example, the microcomputer 12051 can perform cooperative control for the purpose of preventing glare, such as switching from a high beam to a low beam, by controlling the headlamp according to the position of a preceding vehicle or an oncoming vehicle detected by the outside-vehicle information detection unit 12030.

The audio/image output portion 12052 transmits an output signal of at least one of sound and an image to an output device capable of visually or audibly notifying a passenger or the outside of the vehicle of information. In the example of FIG. 14, an audio speaker 12061, a display portion 12062, and an instrument panel 12063 are illustrated as the output device. The display portion 12062 may include at least one of an on-board display and a head-up display, for example.

Figure 15:
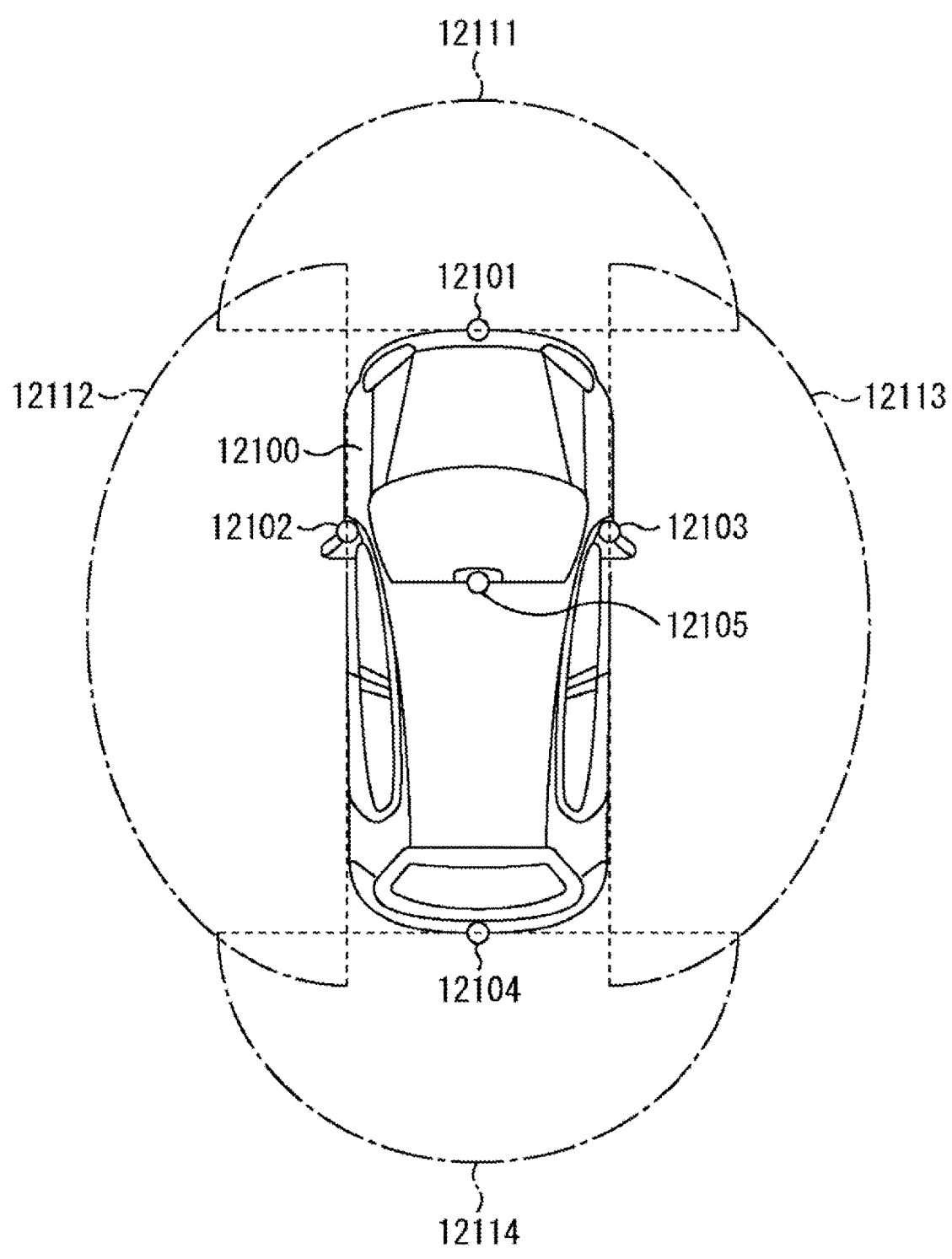
FIG. 15 is a diagram illustrating an example of an installation position of an imaging portion in the moving body control system.

FIG. 15 is a diagram showing an example of an installation position of the imaging portion 12031.

In FIG. 15, a vehicle 12100 includes imaging portions 12101, 12102, 12103, 12104, and 12105 as the imaging portion 12031.

The imaging portions 12101, 12102, 12103, 12104, and 12105 are provided at positions such as a front nose, side-view mirrors, a rear bumper, a back door, and an upper portion of a windshield in a vehicle interior of the vehicle 12100, for example. The imaging portion 12101 provided on the front nose and the imaging portion 12105 provided in the upper portion of the windshield in the vehicle interior mainly acquire images of the front of the vehicle 12100. The imaging portions 12102 and 12103 provided on the side-view mirrors mainly acquire images of a lateral side of the vehicle 12100. The imaging portion 12104 provided on the rear bumper or the back door mainly acquires images of the rear of the vehicle 12100. Front view images acquired by the imaging portions 12101 and 12105 are mainly used for detection of preceding vehicles, pedestrians, obstacles, traffic lights, traffic signs, lanes, and the like.

FIG. 15 shows an example of imaging ranges of the imaging portions 12101 to 12104. An imaging range 12111 indicates an imaging range of the imaging portion 12101 provided at the front nose, imaging ranges 12112 and 12113 respectively indicate the imaging ranges of the imaging portions 12102 and 12103 provided at the side-view mirrors, and an imaging range 12114 indicates the imaging range of the imaging portion 12104 provided at the rear bumper or the back door. For example, by superimposing image data captured by the imaging portions 12101 to 12104, it is possible to obtain a bird's-eye view image viewed from the upper side of the vehicle 12100.

At least one of the imaging portions 12101 to 12104 may have a function for obtaining distance information. For example, at least one of the imaging portions 12101 to 12104 may be a stereo camera constituted by a plurality of imaging elements or may be an imaging element that has pixels for phase difference detection.

For example, the microcomputer 12051 can extract, particularly, a closest three-dimensional object on a path through which the vehicle 12100 is traveling, which is a three-dimensional object traveling at a predetermined speed (for example, 0 km/h or higher) in the substantially same direction as the vehicle 12100, as a preceding vehicle by acquiring a distance to each three-dimensional object in the imaging ranges 12111 to 12114 and temporal change in the distance (a relative speed with respect to the vehicle 12100) on the basis of distance information obtained from the imaging portions 12101 to 12104. Furthermore, the microcomputer 12051 can set an inter-vehicle distance to be secured in advance in front of a preceding vehicle and can perform automated brake control (also including following stop control) or automated acceleration control (also including following start control). This can perform cooperative control for the purpose of, for example, autonomous driving in which the vehicle autonomously travels without the need for driver's operations.

For example, the microcomputer 12051 can classify and extract three-dimensional data regarding three-dimensional objects into two-wheeled vehicles, normal vehicles, large vehicles, pedestrians, and other three-dimensional objects such as electric poles based on distance information obtained from the imaging portions 12101 to 12104 and can use the three-dimensional data to perform automated avoidance of obstacles. For example, the microcomputer 12051 differentiates surrounding obstacles of the vehicle 12100 into obstacles which can be viewed by the driver of the vehicle 12100 and obstacles which are difficult to view. Then, the microcomputer 12051 determines a collision risk indicating the degree of risk of collision with each obstacle, and when the collision risk is equal to or higher than a set value and there is a possibility of collision, an alarm is output to the driver through the audio speaker 12061 or the display portion 12062, forced deceleration or avoidance steering is performed through the drive system control unit 12010, and thus it is possible to perform driving support for collision avoidance.

At least one of the imaging portions 12101 to 12104 may be an infrared camera that detects infrared rays. For example, the microcomputer 12051 can recognize a pedestrian by determining whether there is a pedestrian in the captured image of the imaging portions 12101 to 12104. Such pedestrian recognition is performed by, for example, a procedure in which feature points in the captured images of the imaging portions 12101 to 12104 as infrared cameras are extracted and a procedure in which pattern matching processing is performed on a series of feature points indicating an outline of an object to determine whether or not the object is a pedestrian. When the microcomputer 12051 determines that there is a pedestrian in the captured images of the imaging portions 12101 to 12104 and the pedestrian is recognized, the audio/image output portion 12052 controls the display portion 12062 so that a square contour line for emphasis is superimposed and displayed with the recognized pedestrian. In addition, the audio/image output portion 12052 may control the display portion 12062 so that an icon indicating a pedestrian or the like is displayed at a desired position.

An example of the vehicle control system to which the technology according to the present disclosure can be applied has been described above. The technology according to the present disclosure can shorten the drawing time as compared to the full-screen drawing by applying the technology according to the present disclosure to the vehicle control system in which the imaging portion 12031 has an image sensor having a rolling shutter function. Therefore, verification of the automated driving can be performed quickly.

<Configurations that can be Adopted by Present Disclosure>

The present disclosure can also be configured as follows:

<<A. Rendering System>>

[A-1] A rendering system including: an image sensor model having a rolling shutter function of performing exposure in units of line blocks using one or a plurality of pixel rows as one line block; and a rendering engine for processing and drawing image data, wherein the image sensor model controls the rendering engine so that only a region of a line block being exposed is drawn.

[A-2] The rendering system according to [A-1], wherein the image sensor model has a function of performing viewpoint tracing so that a trajectory of light reaching a viewpoint is traced back from the viewpoint to a light source.

[A-3] The rendering system according to [A-2], wherein the image sensor model performs scanning in units of line blocks and provides information on a ray tracing direction and a ray tracing period to the rendering engine for each exposure position.

[A-4] The rendering system according to [A-3], wherein the rendering engine calculates an arrival position of a ray based on the information of the ray tracing direction provided from the image sensor model, and obtains a spectral reflectance of an object at the arrival position.

[A-5] The rendering system according to [A-4], wherein the rendering engine traces a ray in a reflection direction after reaching the object at the arrival position to obtain a spectral radiation amount of the reached light source.

[A-6] The rendering system according to [A-5], wherein the rendering engine obtains a spectral irradiance of a sensor image plane of the image sensor model based on the spectral reflectance of an object and a spectral radiation amount of the light source.

[A-7] The rendering system according to [A-2], the rendering system has a lens model between the image sensor model and the rendering engine.

[A-8] The rendering system according to [A-7], wherein the image sensor model performs scanning in units of line blocks and provides information on a ray tracing direction and a ray tracing period to the lens model for each exposure position.

[A-9] The rendering according to [A-8], wherein the lens model calculates a ray tracing direction based on the information on the ray tracing direction provided from the image sensor model, and provides a calculation result to the rendering engine.

[A-10] The rendering according to [A-9], wherein the rendering engine calculates an arrival position of a ray based on the calculation result for the ray tracing direction provided from the lens model to obtain a spectral reflectance of an object at the arrival position.

[A-11] The rendering system according to [A-10], wherein the rendering engine traces a ray in a reflection direction after reaching the object at the arrival position to obtain the spectral radiation amount of the reached light source.

[A-12] The rendering system according to [A-11], wherein the rendering engine obtains a spectral irradiance of a sensor image plane of the image sensor model based on the spectral reflectance of the object and the spectral irradiance of the light source.

[A-13] The rendering system according to any one of [A-7] to [A-12], wherein the image sensor model has an on-chip lens on a pixel and corrects a viewpoint position based on a pupil correction shift amount of the on-chip lens with respect to the pixel.

[A-14] The rendering system according to [A-13], wherein the lens model corrects the viewpoint position based on the pupil correction shift amount of the on-chip lens.

17 18

<<B. Automated Driving Verification System>>

[B-1] An automated driving verification system including: an image sensor model having a rolling shutter function of performing exposure in units of line blocks using one or a plurality of pixel rows as one line block; a rendering engine for processing and drawing image data; and an application processor on which a verification target automated driving software is mounted, wherein the image sensor model controls the rendering engine so that only a region of a line block being exposed is drawn.

[B-2] The automated driving verification system according to claim 15, wherein the image sensor model has a function of performing viewpoint tracing so that a trajectory of light reaching a viewpoint is traced back from the viewpoint to a light source.

[B-3] The automated driving verification system according to [B-1] or [B-2], wherein the application processor is mounted on a same image processing unit or a central processing unit as the image sensor model and the rendering engine to verify the mounted automated driving software.

[B-4] The automated driving verification system according to [B-1] or [B-2], wherein the image sensor model and the rendering engine are mounted on a same image processing unit, and the application processor is mounted on an electronic control unit that is electrically connected to the image processing unit via a camera interface to verify the mounted automated driving software.

[B-5] The automated driving verification system according to [B-1] or [B-2], wherein the image sensor model and the rendering engine are mounted on separate image processing units that are electrically connected via a display interface, and the application processor is mounted on an electronic control unit that is electrically connected to the image processing unit on which the image sensor model is mounted via a camera interface to verify the mounted automated driving software.

REFERENCE SIGNS LIST

1A Rendering system of first embodiment
1B Rendering system of second embodiment
10 Image sensor model
11 Pixel
12 On-chip lens (OCL)
20 Rendering engine
30 Lens model
40 Application processor
50 GPU (image processing unit)/CPU (central processing unit)
60 ECU (electronic control unit)
70 Camera I/F
80 Display I/F

The invention claimed is:

1. A rendering system, comprising:
a memory configured to store computer-executable instructions; and
at least one processor configured to execute the computer-executable instructions to:
execute a rolling shutter operation to perform exposure in units of line blocks using one pixel row or a plurality of pixel rows as one line block;
execute a rendering operation to process and draw image data; and
control the rendering operation to draw only a region of a line block that is exposed.

2. The rendering system according to claim 1, wherein the at least one processor is further configured to execute a viewpoint tracing operation to trace back a trajectory of light, reaching a viewpoint, from the viewpoint to a light source.

3. The rendering system according to claim 2, wherein the at least one processor is further configured to:
execute a scanning operation in units of line blocks; and
output information on a ray tracing direction and a ray tracing period for each exposure position of a plurality of exposure positions.

4. The rendering system according to claim 3, wherein the at least one processor is further configured to:
calculate an arrival position of a ray based on the information of the ray tracing direction; and
obtain a spectral reflectance of an object at the arrival position.

5. The rendering system according to claim 4, wherein the at least one processor is further configured to:
trace the ray in a reflection direction after the ray reaches the object at the arrival position; and
obtain a spectral radiation amount of the light source reached by the ray.

6. The rendering system according to claim 5, wherein the at least one processor is further configured to obtain a spectral irradiance of a sensor image plane based on the spectral reflectance of the object and the spectral radiation amount of the light source.

7. The rendering system according to claim 2, wherein the at least one processor is further configured to execute a lens modeling operation.

8. The rendering system according to claim 7, wherein the at least one processor is further configured to:
execute a scanning operation in units of line blocks; and
output ray tracing direction information and a ray tracing period to the lens modeling operation for each exposure position of a plurality of exposure positions.

9. The rendering system according to claim 8, wherein the at least one processor is further configured to:
calculate a ray tracing direction based on the ray tracing direction information; and
output a calculation result of the calculation of the ray tracing direction.

10. The rendering system according to claim 9, wherein the at least one processor is further configured to:
calculate an arrival position of a ray based on the calculation result for the ray tracing direction; and
obtain a spectral reflectance of an object at the arrival position.

11. The rendering system according to claim 10, wherein the at least one processor is further configured to:
trace the ray in a reflection direction after the ray reaches the object at the arrival position; and
obtain a spectral radiation amount of the light source reached by the ray.

12. The rendering system according to claim 11, wherein the at least one processor is further configured to obtain a spectral irradiance of a sensor image plane based on the spectral reflectance of the object and the spectral radiation amount of the light source.

13. The rendering system according to claim 7, wherein the at least one processor is further configured to control correction of a viewpoint position based on a pupil correction shift amount of an on-chip lens with respect to a pixel.

14. The rendering system according to claim 7, wherein the at least one processor is further configured to control, based on the lens modeling operation, correction of a viewpoint position based on a pupil correction shift amount of an on-chip lens.

15. An automated driving verification system, comprising:

a memory configured to store computer-executable instructions;

at least one processor configured to execute the computer-executable instructions to:

execute a rolling shutter operation to perform exposure in units of line blocks using one pixel row or a plurality of pixel rows as one line block;

execute a rendering operation to process and draw image data; and control the rendering operation to draw only a region of a line block that is exposed; and an application processor on which a verification target automated driving software is mountable.

16. The automated driving verification system according to claim 15, wherein the at least one processor is further configured to execute a viewpoint tracing operation to trace back a trajectory of light, reaching a viewpoint, from the viewpoint to a light source.

17. The automated driving verification system according to claim 15, wherein the application processor is mountable on a same image processing unit or a central processing unit as the at least one processor.

18. The automated driving verification system according to claim 15, wherein the at least one processor is mountable on an image processing circuit, and the application processor is mountable on an electronic control circuit that is electrically connected to the image processing circuit via a camera interface.

19. The automated driving verification system according to claim 15, wherein the execution of the rolling shutter operation is on a first image processing circuit, the execution of the rendering operation is on a second image processing circuit different from the first image processing circuit, the first image processing circuit is electrically connected to the second image processing circuit via a display interface, and the application processor is mountable on an electronic control circuit that is electrically connected to the first image processing circuit.

\* \* \* \* \*